(12) United States Patent
Van Beugen et al.

(10) Patent No.: US 10,837,563 B2
(45) Date of Patent: Nov. 17, 2020

(54) FLOW STOPPING TOOL FOR PIPELINES

(71) Applicant: J. VAN BEUGEN BEHEER B.V., Hellevoetsluis (NL)

(72) Inventors: Leonard Van Beugen, Goudswaard (NL); Enver Coric, Schiedam (NL)

(73) Assignee: J. van Beugen Beheer B.V., Hellevoetsluis (NL)

( * ) Notice: Subject to any disclaimer, the term of this patent is extended or adjusted under 35 U.S.C. 154(b) by 20 days.

(21) Appl. No.: 16/415,076

(22) Filed: May 17, 2019

(65) Prior Publication Data
US 2019/0353257 A1    Nov. 21, 2019

(30) Foreign Application Priority Data
May 18, 2018    (NL) ..................................... 2020958

(51) Int. Cl.
| | | |
|---|---|---|
| *F16K 7/10* | (2006.01) | |
| *F16L 55/124* | (2006.01) | |
| *F16K 31/126* | (2006.01) | |

(52) U.S. Cl.
CPC ............ *F16K 7/10* (2013.01); *F16K 31/1266* (2013.01); *F16L 55/124* (2013.01)

(58) Field of Classification Search
CPC ........ F16K 7/10; F16K 31/1266; F16L 55/12; F16L 55/132; F16L 55/134

(Continued)

(56) References Cited

U.S. PATENT DOCUMENTS

| | | | | |
|---|---|---|---|---|
| 3,442,539 A | * | 5/1969 | Randall ............... | F16L 27/0828 285/190 |
| 3,498,333 A | * | 3/1970 | Jones ....................... | F16K 7/10 138/93 |

(Continued)

FOREIGN PATENT DOCUMENTS

| | | |
|---|---|---|
| DE | 2712952 A1 | 9/1978 |
| DE | 2923880 A1 | 12/1980 |

(Continued)

OTHER PUBLICATIONS

International Search report and Written Opinion dated Jan. 16, 2019 for NL2020958.

*Primary Examiner* — Patrick F Brinson
(74) *Attorney, Agent, or Firm* — Hoyng Rokh Monegier LLP; David P. Owen

(57) ABSTRACT

A flow stopping tool for pipelines is disclosed, wherein the flow stopping tool comprises an inflatable balloon-like element that is in connection to a pressure rod, and a hinged coupling for securing the balloon-like element upon introduction into the pipeline, the hinged coupling comprising: a first element comprising a housing, a second element that is in connection to the balloon-like element; a buckling member connecting the first element to the second element, the buckling member being received in the housing of the first element. The buckling member comprises a cylinder that is configured to rotate around its longitudinal axis such that the second element can hinge with respect to the first element. The cylinder comprises at least one opening that facilitates measurement of the pressure of the flow in the pipeline, and the cylinder comprises at least one further opening that facilitates inflation of the balloon-like element.

18 Claims, 16 Drawing Sheets

(58) Field of Classification Search
USPC .................................................. 138/93, 89
See application file for complete search history.

(56) References Cited

U.S. PATENT DOCUMENTS

| | | | | |
|---|---|---|---|---|
| 3,842,864 | A | * | 10/1974 | Riegel .................. F16L 55/124 138/93 |
| 4,291,727 | A | * | 9/1981 | Yie .......................... F16K 7/10 137/318 |
| 4,458,721 | A | * | 7/1984 | Yie .......................... F16K 7/10 137/318 |
| 5,477,886 | A | | 12/1995 | Van Beugen et al. |
| 5,524,661 | A | * | 6/1996 | Tigerholm .............. F16L 55/12 137/15.15 |
| 5,778,919 | A | | 7/1998 | Petrone |
| 2008/0163941 | A1 | * | 7/2008 | Lundman .............. F16L 55/124 137/615 |
| 2012/0192983 | A1 | | 8/2012 | Govaert |
| 2014/0366976 | A1 | | 12/2014 | Al Shammary |
| 2018/0045356 | A1 | * | 2/2018 | Sutton .................. F16L 55/124 |

FOREIGN PATENT DOCUMENTS

| | | | |
|---|---|---|---|
| EP | 0543458 | A1 | 5/1993 |
| EP | 0989344 | A1 | 3/2000 |

* cited by examiner

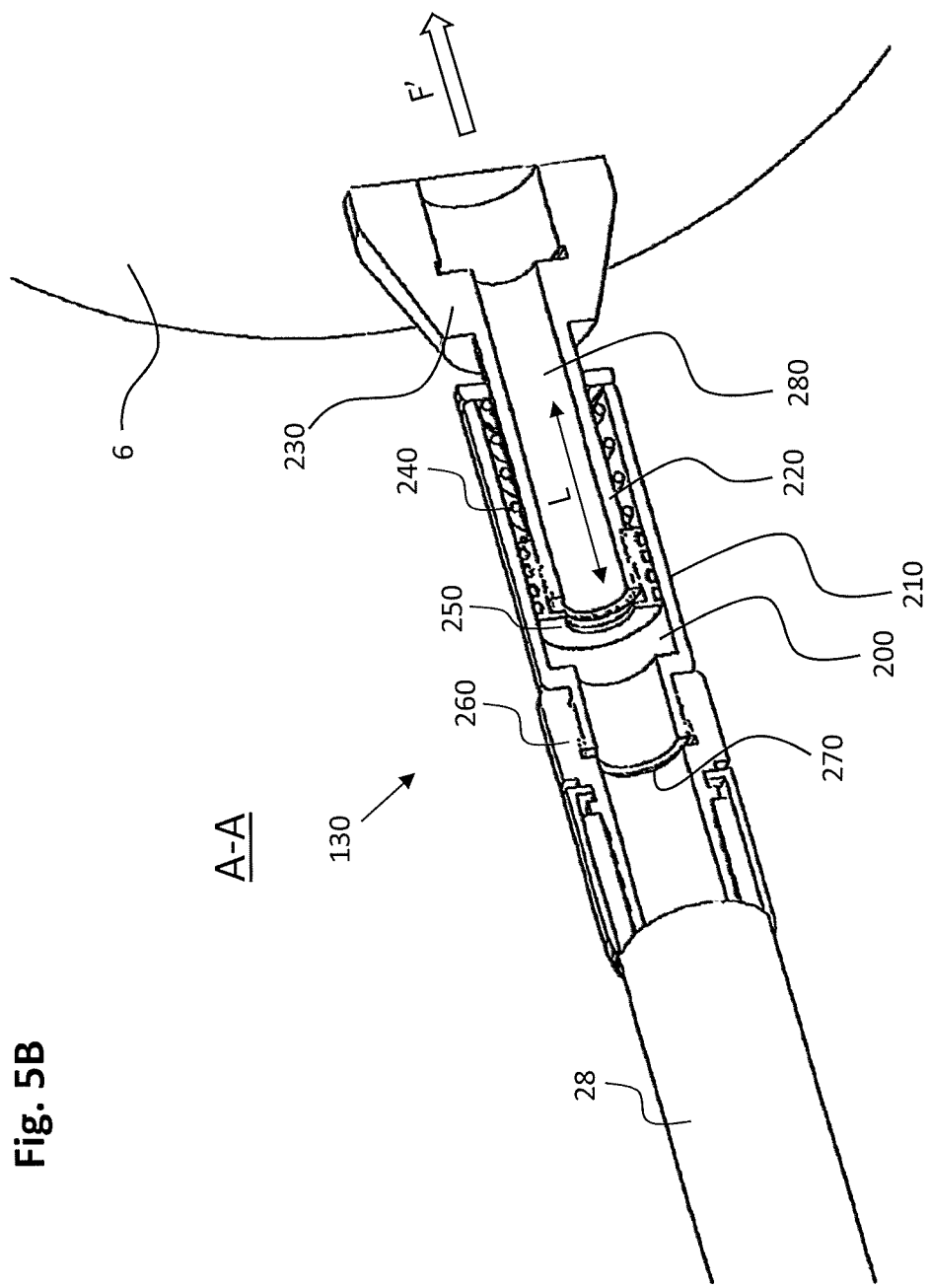

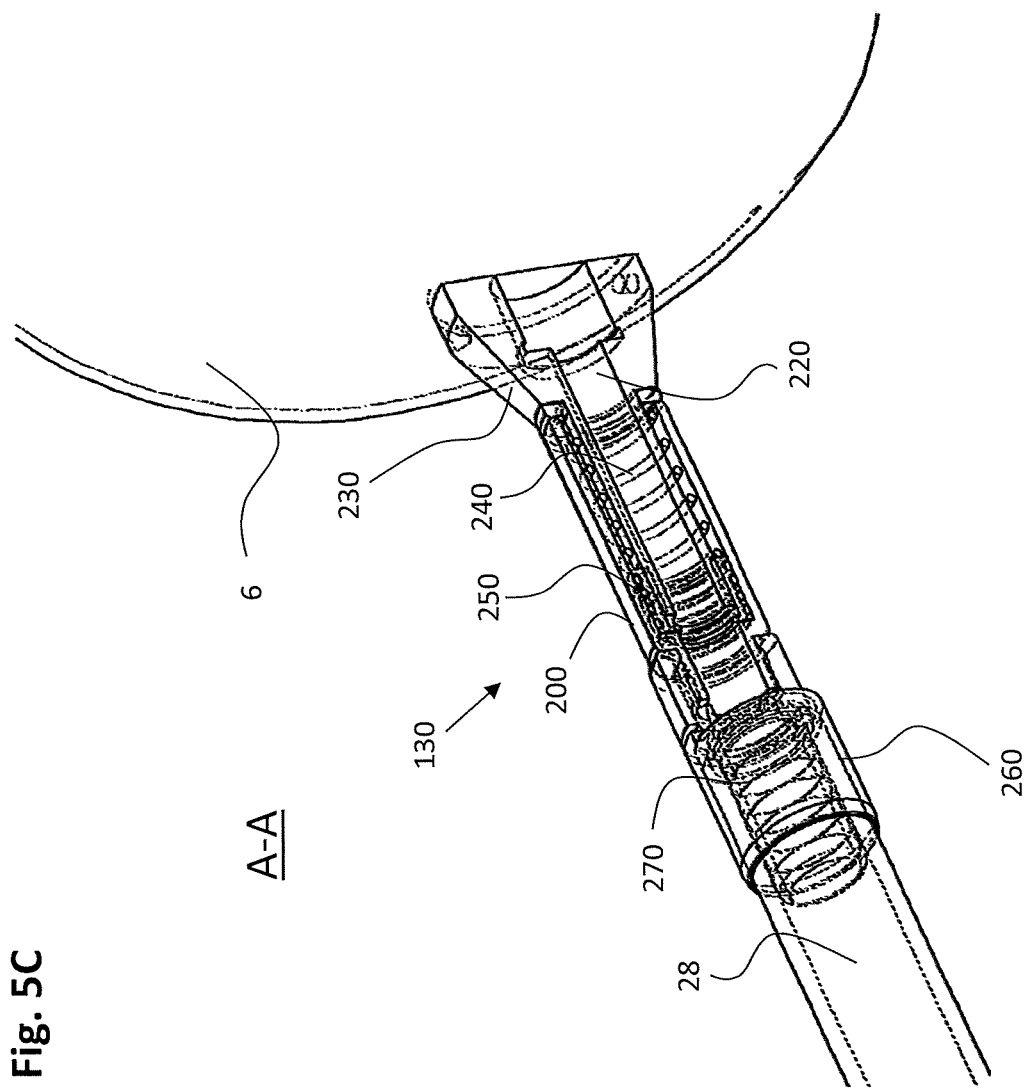

FLOW STOPPING TOOL FOR PIPELINES

TECHNICAL FIELD

The present invention relates to flow stopping tools for live maintenance and new construction operations on pipelines.

BACKGROUND ART

Pipelines are essential for urban and industrial applications. For example, pipelines are used for the transportation of liquids or gases below and above the ground or sea. These types of pipelines typically have operating pressures larger than 8 bar (120 psi). Other type of pipelines are distribution or utility pipelines with typical operating pressures smaller than or equal to 8 bar (120 psi) and are commonly used for the distribution of gases and liquids to end users such as living quarters and industrial areas. In case a section of a transportation or distribution pipeline needs to be isolated, for example to facilitate maintenance work, repairs or the insertion of tee's or branches, it is necessary to stop the flow in the pipeline. Flow stopping tools are typically used for these type of operations as they allow an operator to insert a stopping device such as an inflatable balloon like element into the pipeline. In this way the operator is not prone to a continuous flow of gases or liquids that escape once the isolated section is cut.

Known flow stopping tools comprise an external dome that is mounted on a valve which is connected to a pipeline by means of a saddle or welded socket. The external dome facilitates a passage in which a hollow lance can be movably inserted. The hollow lance also comprises a passage itself, through which a pressure rod with inflatable balloon-like element can be movably inserted. The hollow lance further comprises an introducer shoe at its bottom end which can be introduced into the pipeline via the valve. In use, the balloon-like element is pushed downwards towards the introducer shoe, while the balloon-like element is in a deflated state. Once the balloon-like element has been introduced into the pipeline, the balloon-like element is inflated until it reaches a final inflation stage in which the balloon-like element exerts sufficient pressure on the inner wall of the pipeline such that a flow in the pipeline can be stopped.

It is common practice to position further inflated balloon-like elements at locations in the pipeline adjacent to the first balloon-like element using further flow stopping tools. A minimum of one balloon-like element at each side of the isolated section thereby blocks the flow inside the pipeline.

The balloon-like element of known flow stopping tools usually comprises a hose, which has multiple functionalities. Accordingly, the hose is used to inflate the balloon-like element, to align the balloon-like element in the correct position in the pipeline and to secure the balloon-like element in a position while the balloon-like element is brought into the inflated state.

In an intermediate stage where the balloon-like element is being inflated but has not yet reached its final inflation stage, the balloon-like element and hose end part may experience a large kinetic force resulting from the pipeline flow in case this flow has a high flow speed. As a consequence, the hose may get damaged which may result in a leakage of the medium that is used for inflating the balloon-like element. In a worst-case scenario, the balloon-like element may be completely ruptured from the hose and will get lost in the pipeline.

US patent application US 2014/0366976 proposes a valve insertion tool that allows for inspection, repair and/or replacement of a relief valve without having to shut down significant portions of a parent system. In particular, a single resilient finger portion is used for deflecting an inflatable balloon upon insertion into a valve. The finger portion thus adds to deflection of the balloon into a desired position, but does not strengthen the balloon-hose connection.

U.S. Pat. No. 4,458,721 proposes a flow stopping tool using a flow restrictor cartridge for restricting a fluid flow in a pipeline. The front and rear end plugs of the cartridge are attached to a multisection member passing through the central portion of a flexible sleeve, with each of the sections only being pivotally engaged. Consequently, the cartridge cannot shorten in length upon inflation of the sleeve. The tool of U.S. Pat. No. 4,458,721 is therefore not compatible with balloon-like elements having reinforcement wires or a guiding shaft as disclosed in U.S. Pat. No. 5,477,886. Furthermore, the tool of U.S. Pat. No. 4,458,721 employs sleeve retainer arms, which are pushed outwards by the sleeve upon inflation. The proposed construction is said to allow the flow stopping tool to withstand considerably greater fluid forces in the pipeline. However, such a construction with sleeve retainer arms may not be desirable, since for example the retainer arms may damage the pipeline. Finally, it is noted that the tool of U.S. Pat. No. 4,458,721 uses an elbow construction for inserting the cartridge in the pipeline, wherein the elbow construction comprises a cartridge elbow and a cartridge adapter. A pivot screw is used that allows the cartridge elbow to rotate around the cartridge adapter. During insertion of the cartridge with sleeve into the pipeline, a spring urges the cartridge towards a position perpendicular (90°) to said adapter. A flow passage for fluid for inflation of the flexible sleeve is created only in this configuration of the cartridge elbow and arm. The cartridge may thus not be inserted into the pipeline at other, more general insertion angles.

OBJECTS OF THE INVENTION

One object of the present invention is to provide a balloon like element for use with the flow stopping tool which eliminates the problems inherent to the hose-balloon connection. This and other objects have been attained according to the present invention.

SUMMARY OF THE INVENTION

In a first aspect of the present invention there is a flow stop tool that comprises an external dome that is mounted on a valve which is connected to the pipelines by means of a saddle or welded socket, arranged for introducing a balloon-like element into a pressurized pipeline. The flow stopping tool further comprises a moveable internal hollow lance with an insertion shoe, wherein the movable lance can move inside the external dome. The flow stopping tool further comprises a pressure rod that can move inside the movable lance, wherein the pressure rod has an inflatable balloon-like element made of a natural reinforced rubber, an elastomer or an elastic material which is able to stop the flow in the pipeline after inflation. The pressure rod may be further arranged with a device for measuring the inflation pressure of the balloon-like element and a device for measuring the pressure in the pipeline in front of the balloon like element. Furthermore, the pressure rod is provided with a hinged coupling for securing the balloon-like element to the pressure rod. The hinged coupling comprises a first element that is in connection to the pressure rod, a second element that is in connection to the balloon-like element, and a buckling member that connects the first element to the second element, wherein the buckling member allows hinging of the second element with respect to the first element.

The first element comprises a housing, and the buckling member comprises a cylinder that is configured to rotate around its longitudinal axis such that the second element can hinge with respect to the first element, wherein the cylinder comprises at least one opening that facilitates measurement of the pressure in front of the balloon-like element in the pipeline, and wherein the cylinder comprises at least one further opening that facilitates inflation of the balloon-like element.

Preferably, the cylinder of the hinged coupling comprises a groove comprising an opening that facilitates the measurement of the pressure in front of the balloon-like element in the pipeline.

Furthermore, preferably the cylinder comprises two further grooves, each further groove comprising an opening that facilitates inflation of the balloon-like element.

Furthermore, the second element of the hinged coupling may be connected to a shock absorber, wherein the shock absorber is connected to the balloon-like element.

Preferably, the balloon-like element has a body part made from rubber which is entirely reinforced with a non-elastic fiber extending from one cross cut end to the other cross cut end of the rubber body of the balloon-like element. If such a balloon like element is inflated, the surface of the balloon like element does not increase. Irrelevant from their sizes, such balloon-like elements require the same internal inflation pressure.

Preferably, the balloon-like element can resist a flow inside the pipeline of 5 meter per second. Preferably, the balloon-like element is compatible with a pressure of up to 4 bar.

In some embodiments of the invention, the balloon-like element preferably is provided with a flap on one or both of the outer ends of the balloon like element. In a preferred embodiment, the balloon-like element is adapted to close a pipe having a diameter in the range between 200 and 600 millimeter.

In a preferred embodiment, the flow stopping tool, being adapted to be connected to the pipeline, comprises an external dome, an internal hollow moveable lance, and inside the movable lance a moveable pressure rod. Preferably, the movable lance comprises an insertion shoe for insertion of the stopper such as a balloon-like element into a pipeline, wherein the insertion shoe is provided with an angled exit through which the balloon-like element can be properly positioned in a pipeline. In some embodiments, the bottom part of the introducer shoe is shaped parabolic.

Preferably, the hinged coupling comprises parts of stainless steel, sufficiently strong to resist a flow speed of 5 meter per second.

In a first embodiment of the hinged coupling, the first element is in connection to the pressure rod, wherein the first element may be arranged to guide a hose to the balloon-like element, such as a cage-like structure, wherein the hinged coupling further comprises a buckling member which may be a buckling rod, wherein the buckling rod may hinge around the first element, and wherein the hinged coupling further comprises a second element that is in connection to the balloon-like element and the buckling rod, wherein the buckling rod is arranged to hinge around the second element. In some embodiments, the second element of the hinged coupling is provided with at least one resilient member, to allow movement of the hinged coupling and hose relative to the balloon-like element.

In another, preferred embodiment of the hinged coupling the first element of the hinged coupling comprises a housing that is adapted to the pressure rod. The lower part of the housing is adapted to receive a buckling member which may be a grooved cylinder that has a moveable connection member that is adapted via the second part of the hinged coupling, which may be a connection to the balloon-like element such as a hollow cylinder. The buckling member is adapted to rotate. In case the buckling member is shaped as a cylinder, the cylinder can rotate around its longitudinal axis. The buckling member may comprise internal grooves with holes, to facilitate a passage for channels that provide for the inflation of the balloon like element, and for the provision of measuring the pressure in front of the balloon-like element. The grooves with openings may describe an angular path of at least 30° on the cylinder, dependent on the desired configuration of the flow stopping tool and related insertion angle of the balloon-like element into the pipeline. A flow stopping tool employing this second embodiment of the hinged coupling does not require a hose for inflating the balloon-like element.

In a preferred embodiment of the present invention, the flow stopping tool of the present invention may be further provided with a shock absorber. For instance, the second element of the hinged coupling can be connected to such a shock absorber, wherein the shock absorber in turn is connected to the balloon-like element. The shock absorber may comprise a first part that is connected to the second element, and a second part that is connected to the balloon-like element, wherein the second part is received in the first part or vice versa, wherein the first and second part are arranged to move in the longitudinal direction with respect to one another. The first and/or second part may be provided with one or more resilient members, such as helical springs. The skilled person however understands that the shock absorber may comprise any other type of resilient member, system or other type of spring such as a resilient beam or a hydraulic system, thereby providing for recoiling means. Furthermore, the first part of the shock absorber may comprise a shock absorber housing, and the second part of the shock absorber comprises a rod which is received in said housing. The at least one resilient member may be provided in said housing. The first part and/or second part may also be provided with one or more sealing rings or O-rings, for providing sealing means of the shock absorber, thereby preventing leaking of the medium that is used to inflate the balloon-like element. The first part of the shock absorber may comprise a female-type connector which may comprise a housing made from, for example, stainless steel, titanium, carbon steel, aluminum or brass. The second part of the shock absorber may comprise a rod which is made from, for example, stainless steel, titanium, carbon steel, aluminum or brass. Furthermore, the shock absorber is arranged such that a passage is facilitated for the passage of medium used for inflating the balloon-like element.

The present invention is of particular advantage for insertion of a balloon-like element under any insertion angle, because the hinged coupling as described herein allows for hinging of the balloon-like element such that the balloon-like element can be inserted into the pipeline at an insertion angle of 90° to 150°. Here, the insertion angle is defined with respect to the horizontal position of the balloon-like element in the pipeline.

In another aspect of the present invention, there is provided a method for stopping a flow in a pipeline, comprising the steps of: installing a flow stopping tool according to the present invention; inserting the balloon-like element into the pipeline by moving the pressure rod in the direction of the pipeline; and inflating the balloon-like element for stopping a flow in the pipeline.

In some embodiments, the following steps are performed prior to installation of the flow stopping tool: mounting a ball valve or a gate valve onto a saddle or welded socket that is mounted onto the pipeline; drilling a hole into the pipeline at a location where the ball valve or gate saddle is mounted onto the pipeline.

In yet another aspect of the present invention, there is provided a procedure for creating an isolated section free of flow or a section free of flow within a pressurized pipeline with flow, comprising the steps of: installing at least one flow stopping tool onto a pipeline by preference installing a second flow stopping tool onto a pipeline; by preference installing a third flow stopping tool onto a pipeline; by preference installing a fourth flow stopping tool onto a pipeline; wherein all four stopping tools each comprise: an external dome with internal hollow moveable lance for inserting a balloon-like element into a pipeline; a balloon-like element for blocking a pipeline flow, wherein the balloon-like element is made of natural reinforced rubber, an elastomer or an elastic material; means to facilitate inflation of the balloon-like element; a pressure rod that is movably arranged within the internal hollow moveable lance, and wherein the pressure rod of at least one of the stopping tools is provided with a hinged coupling for securing the balloon-like element of said at least one stopping tool, and optionally with a shock absorber; introducing the at least one balloon-like element of the stopping tool with the hinged coupling (and shock absorber) as the first to be inflated balloon-like element into the pipeline by moving the pressure rod of said balloon-like element in the direction of the pipeline; inflating said at least one balloon-like element such as to stop the flow in the pipeline.

In some embodiments, prior to installation of the four flow stopping tools the following steps are performed: mounting up to four ball valves or gate valves onto welded sockets or saddles that are on the pipeline; drilling a hole into the pipeline at a location where the ball valve or gate valve is mounted on the pipeline.

Other features and advantages of the present invention will be apparent from the detailed description that follows.

BRIEF DESCRIPTION OF THE ACCOMPANYING DRAWINGS

The present invention is described with respect to particular exemplary embodiments thereof and reference is accordingly made to the drawings in which.

Figure 4:
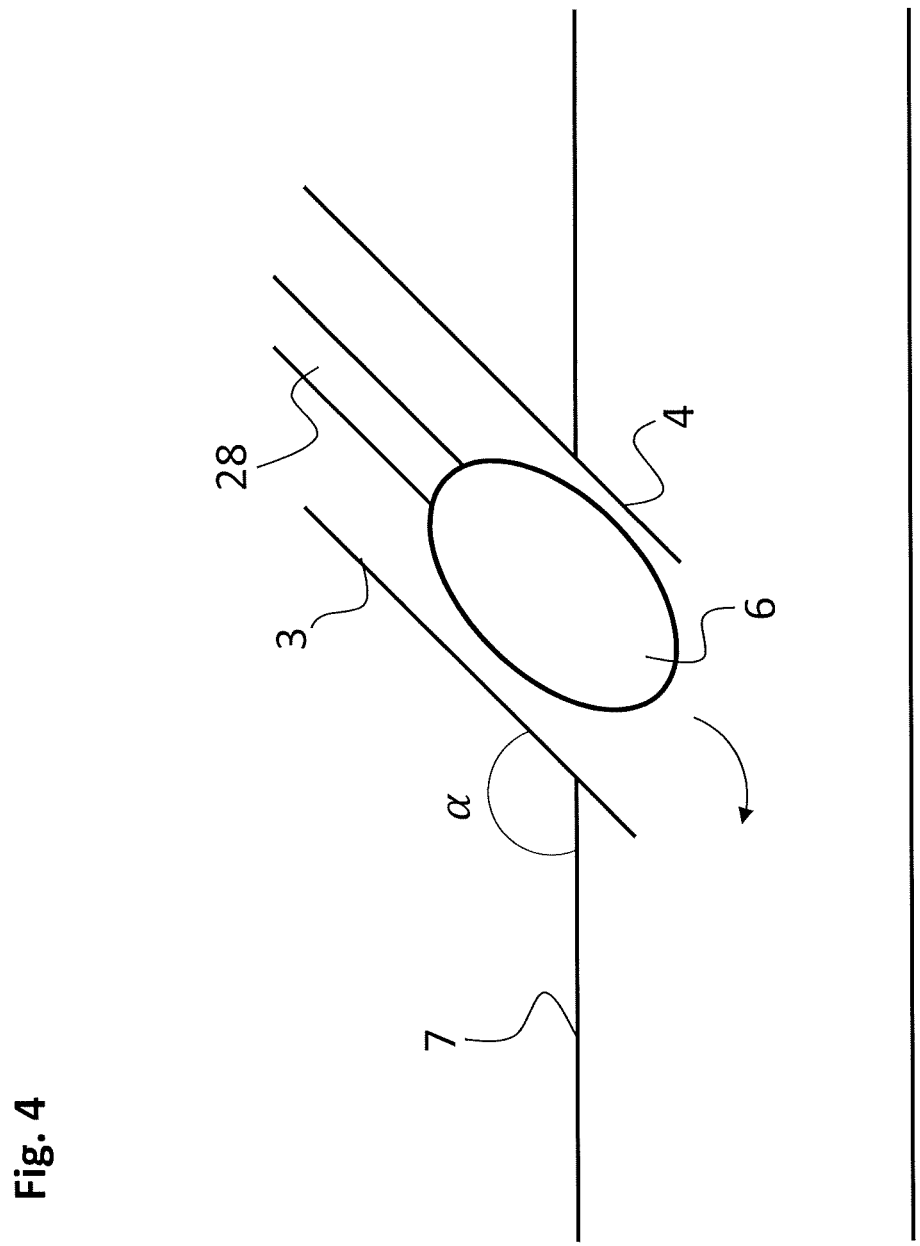
Figure 6:
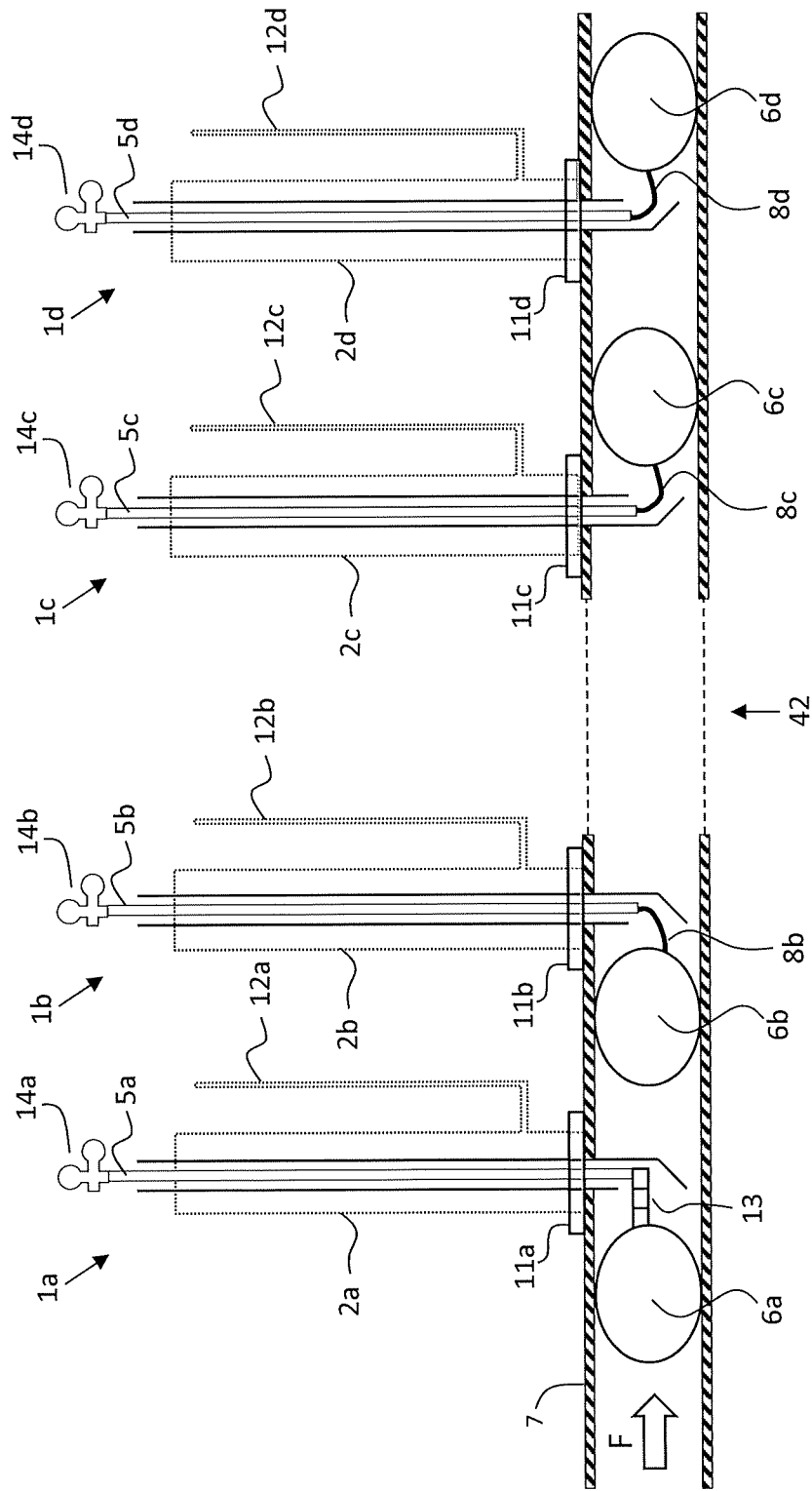

FIGS. 3B-E show different perspectives of a second embodiment of a hinged coupling;

FIG. 4 schematically shows the present invention in use, wherein the flow stopping tool is arranged at a general inclined insertion angle α;

FIGS. 5A-E show different perspectives of a shock breaker for optional use with the flow stopping tool according to the present invention;

FIG. 6 shows an example of an isolated section with no flow in a pipeline that is created by using one or multiple flow stopping tools;

The drawings show only those details essential to an understanding of the present invention.

DETAILED DESCRIPTION

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. Furthermore, this description is not to be considered as limiting the scope of the embodiments described herein in any way, but rather as merely describing the implementation of the various embodiments described herein.

Figure 1:
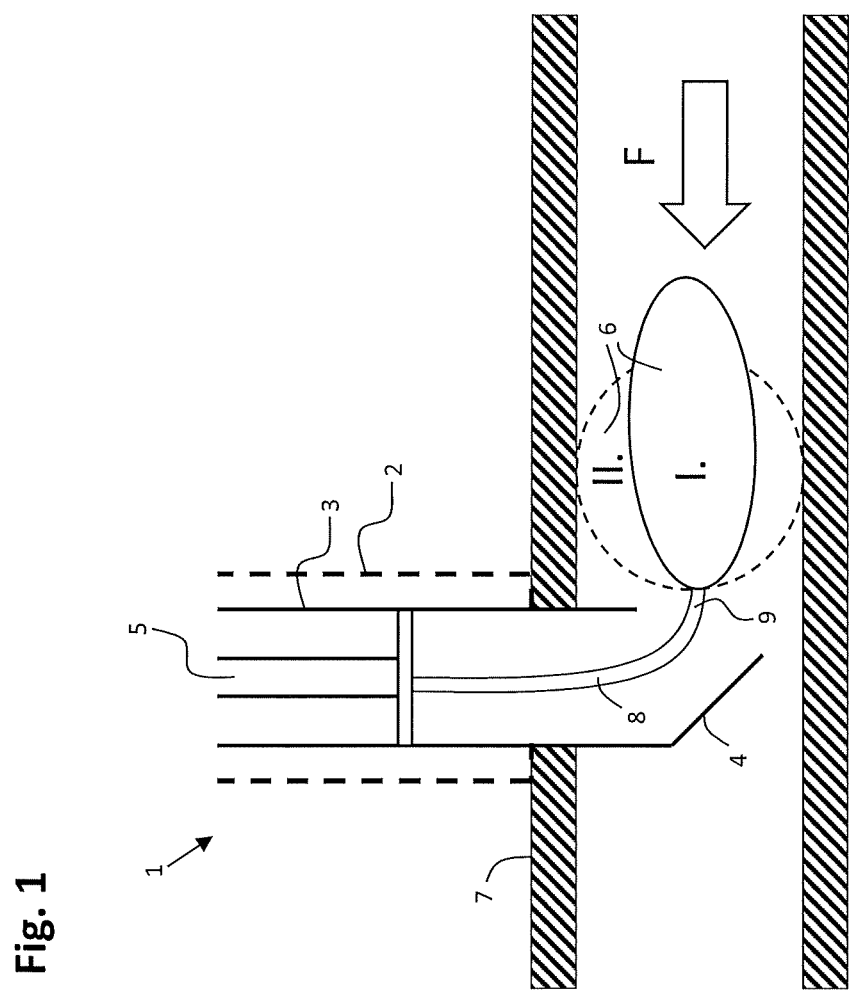
FIG. 1 shows a prior art flow stopping tool.

With reference to FIG. 1, a prior-art flow stopping tool 1 is shown. The flow stopping tool 1 comprises an external dome 2, a moveable lance 3 that can move within external dome 1. Movable lance 3 comprises an insertion shoe 4 and a moveable pressure rod 5 with a balloon-like element 6 as closing plug. The pressure rod 5 may comprise a device for measuring the inflation pressure of the balloon-like element (not shown). In use, the balloon-like element 6 blocks a flow (F) within a pipeline 7.

During insertion of the balloon-like element 6 into the pipeline 7, the balloon-like element 6 is in a deflated state (I). When properly aligned with respect to the pipeline, the balloon-like element 6 is pressurized with a gas or fluid through a hose 8. The balloon-like element 6 is thereby brought into an inflated state (II) such that it closes the passage of the pipeline 7 by providing sufficient pressure on the inner wall of the pipeline 7. During inflation of the balloon-like element 6, the balloon-like element 6 expands and shortens.

The hose 8 is used to guide compressed air from a pressure source (not shown) into balloon-like element 6. Hose 8 comprises an end part 9 that is in connection with the balloon-like element 6. The end part 9 functions to secure the balloon-like element 6 in position during the inflation phase. It may appear that the balloon-like element 6 and the hose end part 9 may experience a high initial kinetic force from the pipeline flow (F). For instance, the flow (F) in the pipeline 7 may propagate with a speed of 5 meter per second or higher. As a consequence, the hose end part 9 and/or the balloon-like element 6 may get damaged during the inflation phase, which may result in a leakage of the compressed air. In a worse case, the balloon-like element 6 may be completely ruptured off from the hose 8.

Figure 2A:
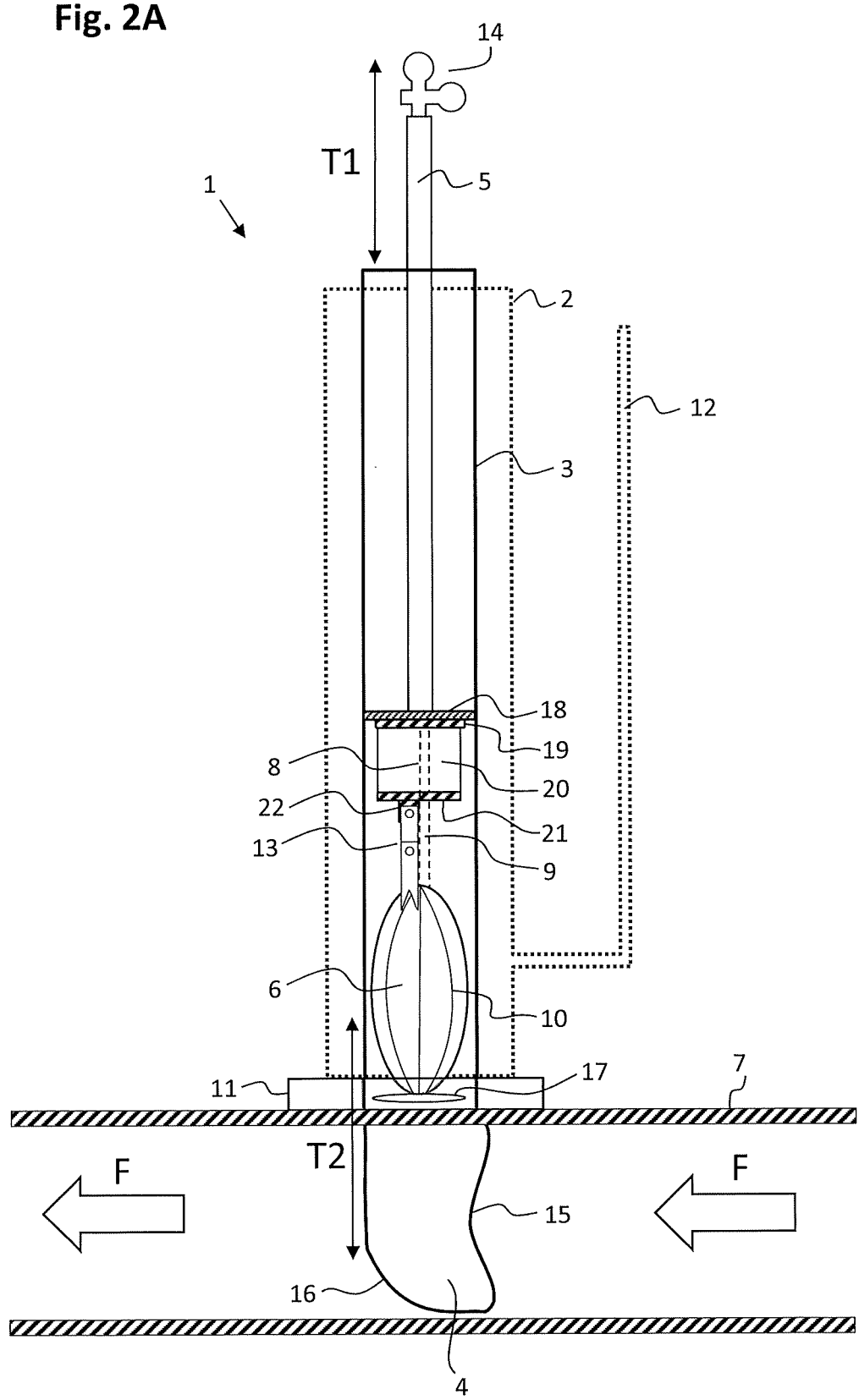
FIG. 2A shows an exemplary embodiment of a flow stopping tool according to the present invention, in which a balloon-like element is located within a moveable lance and is in the deflated state.
Figure 2B:
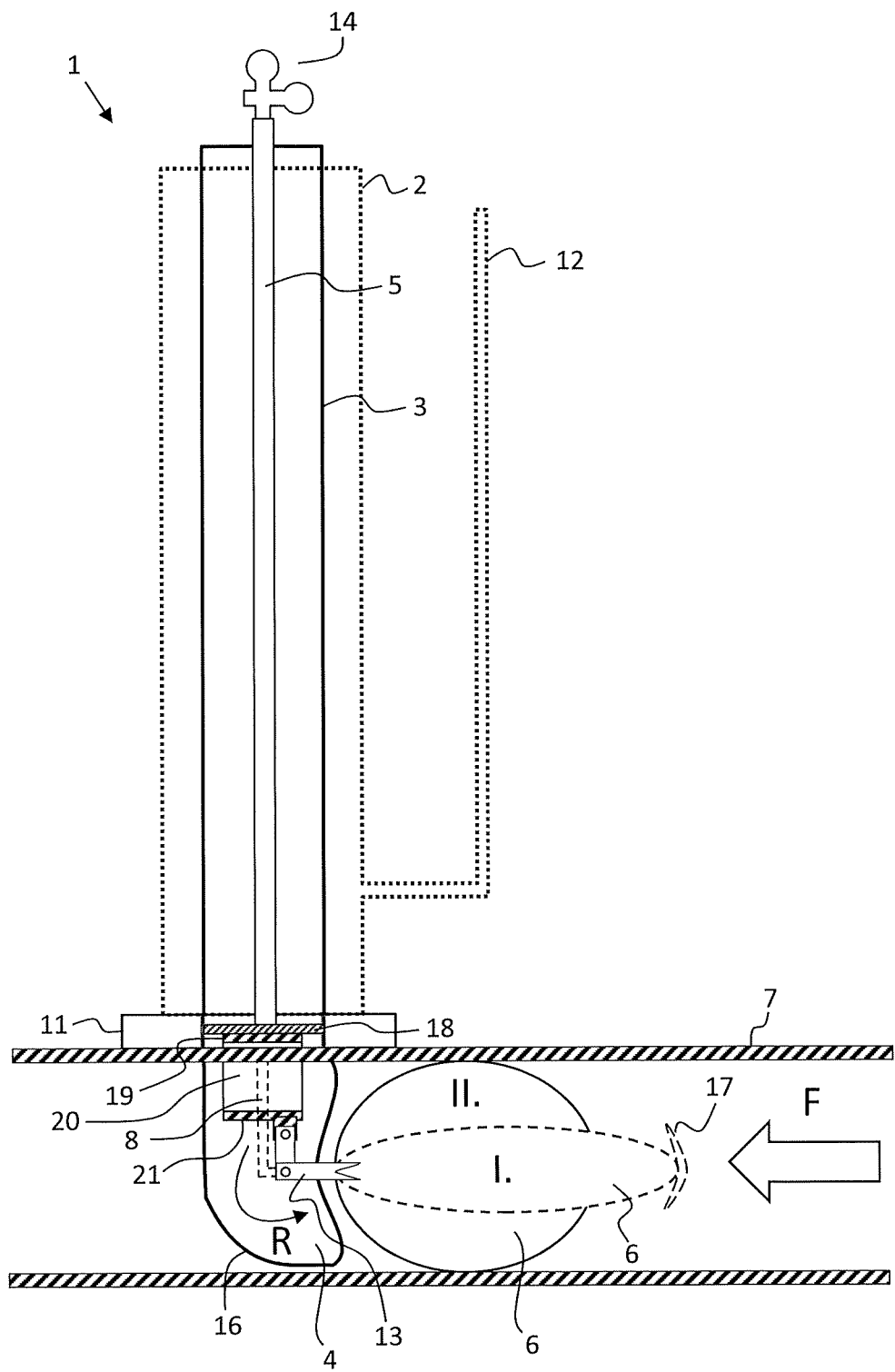
FIG. 2B shows an exemplary embodiment of a flow stopping tool according to FIG. 2A, in which the balloon-like element is located in a pipeline and is brought into the inflated state.

Reference is made to FIGS. 2A and 2B, which show an exemplary embodiment of a flow stopping tool 1 according to the present invention. Flow stopping tool 1 comprises a balloon-like element 6 for blocking a flow (F) in a pipeline 7. Pipeline 7 is for instance a gas pipeline or a liquid pipeline. An example of a balloon-like element 6 is an inflatable closing plug such as manufactured by the methods according to U.S. Pat. No. 5,477,886 or according to U.S. Patent Application US 2012/0192983 A1, the disclosures which are hereby incorporated by reference herein in their entireties. Flow stopping tool 1 may comprise a balloon-like element 6 according to said referred method. Such balloon-like elements are compatible with strong pipeline flows, and are able to resist a back pressure of for example up to 4 bar (58 psi).

The balloon-like element 6 can be inflated through a hose 8 which is connected to a pressure source (not shown). The balloon-like element 6 is inflatable since it is made from an inflatable material, such as an elastic material (e.g. latex or synthetic rubber), and may further comprise a wire or a group of reinforcement wires 10 with low elasticity that extend from one end to the other end of the balloon-like element 6. Such balloons are described in U.S. Pat. No. 5,477,886. The wire or wires 10 may for instance consist of steel, fiber glass, ultra-high molecular weight polyethylene (e.g. Dyneema®) or aramid (e.g. Twaron® or Kevlar®), which can be spun beforehand to wires, and are adhered to the surface of the balloon. As also described in U.S. Pat. No. 5,477,886, the balloon-like element may furthermore be provided with an internal guiding shaft having telescopic moving parts and a spring. The function of said guiding shaft is related to the group of wires. That is, upon inflation, the guiding shaft is shortened in the axial direction, and the balloon-like element therefore only extends in radial direction (not the axial direction), such that the balloon is pressed against the inner wall of the pipe during inflation.

Flow stopping tool 1 further comprises an external dome 2 arranged for introducing the balloon-like element 6 into a pipeline 7. The external dome 2 may be installed on top of a ball valve or gate valve 11 that is mounted on the pipeline 7. The external dome 2 may be provided with a by-pass 12 for bypassing a pipeline flow (F) in pipeline 7. The external dome 2 may comprise a moveable internal hollow lance 3 configured to move up and down in the direction as indicated by (T1). In turn, the moveable lance 3 may comprise a pressure rod 5 configured to move up and down in the direction as indicated by (T2). Pressure rod 5 is in connection with balloon-like element 6 via a hinged coupling 13. Pressure rod 5 may be provided with a device for measuring the pressure in front of the of the balloon-like element, comprising for instance a pressure gauge 14.

The movable lance 3 may comprise an insertion shoe 4 with an exit 15 for facilitating the insertion of the balloon-like element 6 into pipeline 7 through exit 15. The bottom part 16 of insertion shoe 8 may be shaped parabolic. This has the advantage that the balloon-like element 6 does not get stuck or damaged during insertion of the balloon-like element 6 into pipeline 7. Furthermore, balloon-like element 6 may be provided with a flap 17 which protects the balloon-like element 6 during initial contact with pipeline 7 during inflation. Flap 17 may be made from a rubber material. Balloon-like element 6 may also be provided with a flap 17 at either sides of the balloon-like element 6.

During operation, first the movable lance 3 is inserted into the pipeline 7, as shown in FIG. 2A. Thereafter, the balloon-like element 6 is inserted into the pipeline 7 by moving the pressure rod 5 towards the pipeline 7. The balloon like element 6 starts in the deflated state (I) and is inserted into the pipeline 7 through movement of the movable lance 3. The balloon-like element 6 is thus pushed into the bottom part 16 of the introducer shoe 4 which was inserted into pipeline 7. While pushing downwards, the balloon-like element 6 is further advanced into pipeline 7.

When properly aligned with respect to the pipeline 7, the balloon-like element 6 is pressurized with a medium like air or a fluid bringing the balloon-like element 6 in the inflated state (II). The medium used for inflation may be compressible or incompressible, for example air, nitrogen, hydraulic oil or water. The balloon-like element 6 is thereby brought into an inflated state (II) such that the balloon-like element 6 closes the passage of the pipeline 7 by providing sufficient pressure on the inner wall of the pipeline 7. Due to the non-elastic fibers that are embodied in the wall of the rubber body of the balloon like element 6 and the spring mechanism that extends from one end to the other end inside the balloon like element, the balloon-like element shortens while it expands, as the expansion of the internal volume is limited by the applied and embodied fibers onto the rubber wall of the balloon like element 6, the balloon like element can be inflated to a high inflation pressure and will create sufficient shear resistance in order to properly and safely block the pressure and pipeline flow (F).

The pressure rod 5 may be connected to the hinged coupling 13 via a plate 18 that seals the hollow passage inside the movable lance 3 and prevents leaking of the pipeline flow's medium (F) into the upper part of the movable lance 3. The plate 18 may be connected to an upper plate 19 of a guiding member 20 which guides hose 8 to the balloon-like element 6. The guiding member 20 may comprise a lower plate 21 which in turn is connected to the hinged coupling 13. When the balloon-like element 6 is guided through the movable lance 3 and hits the bottom of the insertion shoe 4, the hinged coupling 13 allows hinging such that the balloon-like element 4 rotates over an angle (R) and the balloon-like element 6 can advance through the exit 15 of the introducer shoe 4 into the pipeline 7. This is shown in FIG. 3B. The balloon-like element 6 may be inserted into the pipeline 7 upstream or downstream.

Figure 2C:
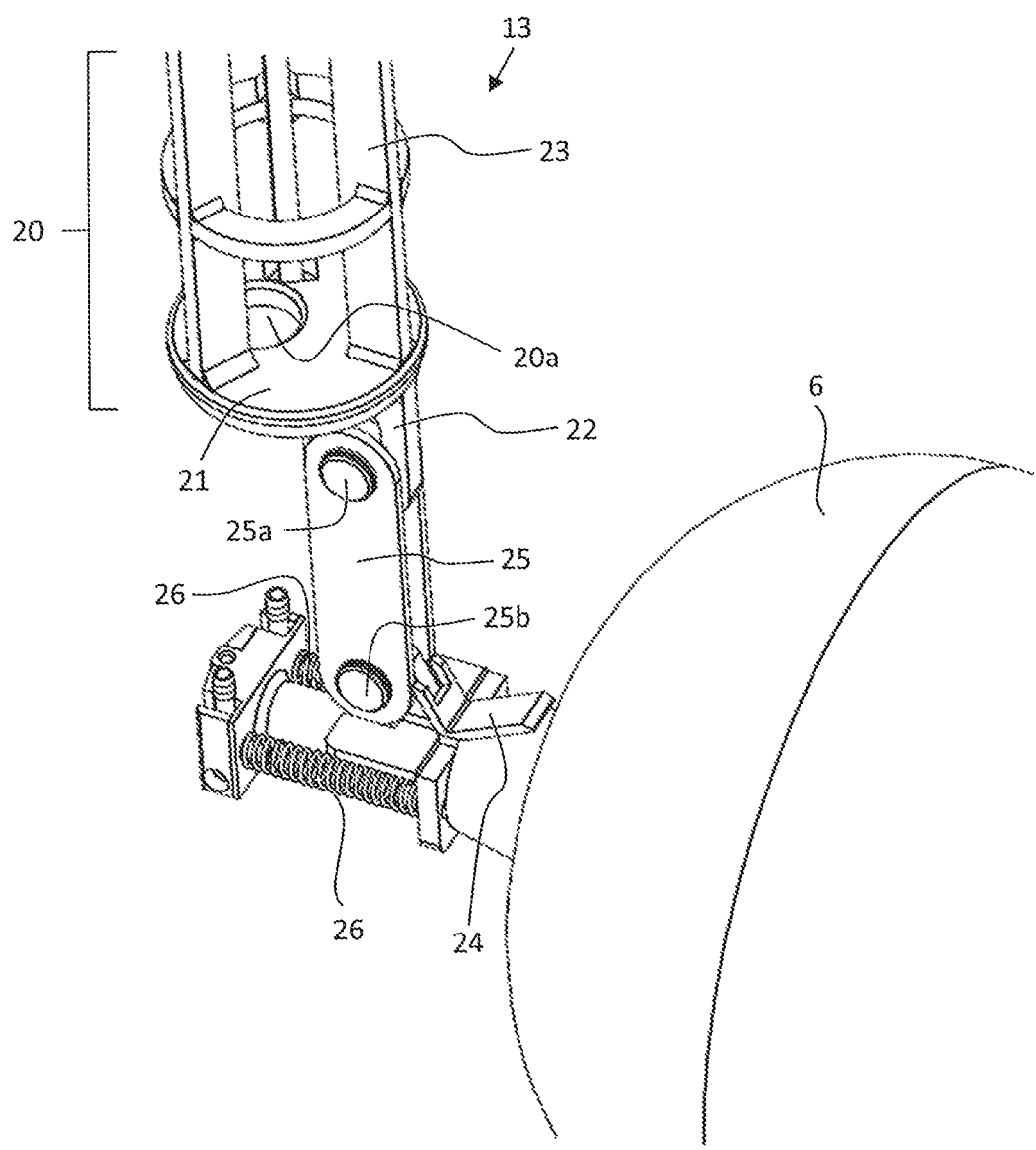
FIG. 2C shows a first embodiment of a hinged coupling.

With reference to FIG. 2C, an exemplary embodiment of the hinged coupling 13 is shown. In this exemplary embodiment, all parts of the hinged coupling 13 are made of stainless steel. Furthermore, in this example, hinged coupling 13 comprises three main elements. A first element of hinged coupling 13 is in connection to the pressure rod. Accordingly, the first element comprises an upper plate 19 (not shown) that is connected to the pressure rod 5, and a lower plate 21 with extension unit 22. Upper plate 19 and lower plate 21 are connected via a guiding member 20. Upper plate 19 may comprise a passage 20a through which the hose 8 can be further guided. The guiding member 20 may comprise a cage-like structure 23. Alternatively, guiding member 20 may be shaped as a hollow cylinder and may be made from stainless steel. A second part of hinged coupling 13 is a connection 24 that is in connection with the balloon-like element 6. Connection 24 may be made from stainless steel. A third part of hinged coupling 13 comprises a buckling member 25. In this example, buckling member 25 comprises a buckling rod 25. A first end 25a of the buckling rod 25 is connected to extension unit 22. The buckling rod 25 can move and hinge around the extension unit 22. A second end 25b of the buckling rod 25 is connected to the second part 24 of the hinged coupling 13. The second part 24 of hinged coupling 13 is connected to balloon-like element 6 such that it can hinge around the second end 25b of buckling rod 25.

The hose may be accompanied by a resilient member. An example of a resilient member is a spiral spring 26 as shown in FIG. 2C, or a hydraulic spring or resilient beam, or any other resilient member (not shown). In the exemplary embodiment of FIG. 2C, connection 24 is accompanied by two spiral springs 26, although any type of resilient member and any number of resilient members may be provided. During inflation, the balloon-like element 6 shortens in its axial direction, thereby asserting a recoiling force on the hose end part 7. A resilient member can provide means for recovering said recoiling force, thereby further securing the balloon-like element 6 during inflation.

During the insertion of the balloon-like element 6 into the pipeline 7, the hinged coupling 13 provides for a strong connection with the balloon-like element 6. All parts of the hinged coupling 13, such as cage-like structure 23 and buckling rod 25 may be made from a strong material, such as stainless steel, titanium, carbon steel, aluminum or brass. The buckling rod 25 may alternatively be made from a resilient material, providing further securing means to secure the balloon-like element 6 into position in the pipeline 7 and to prevent the balloon-like element 6 to be ruptured off from the flow stopping tool 1.

Figure 3A:
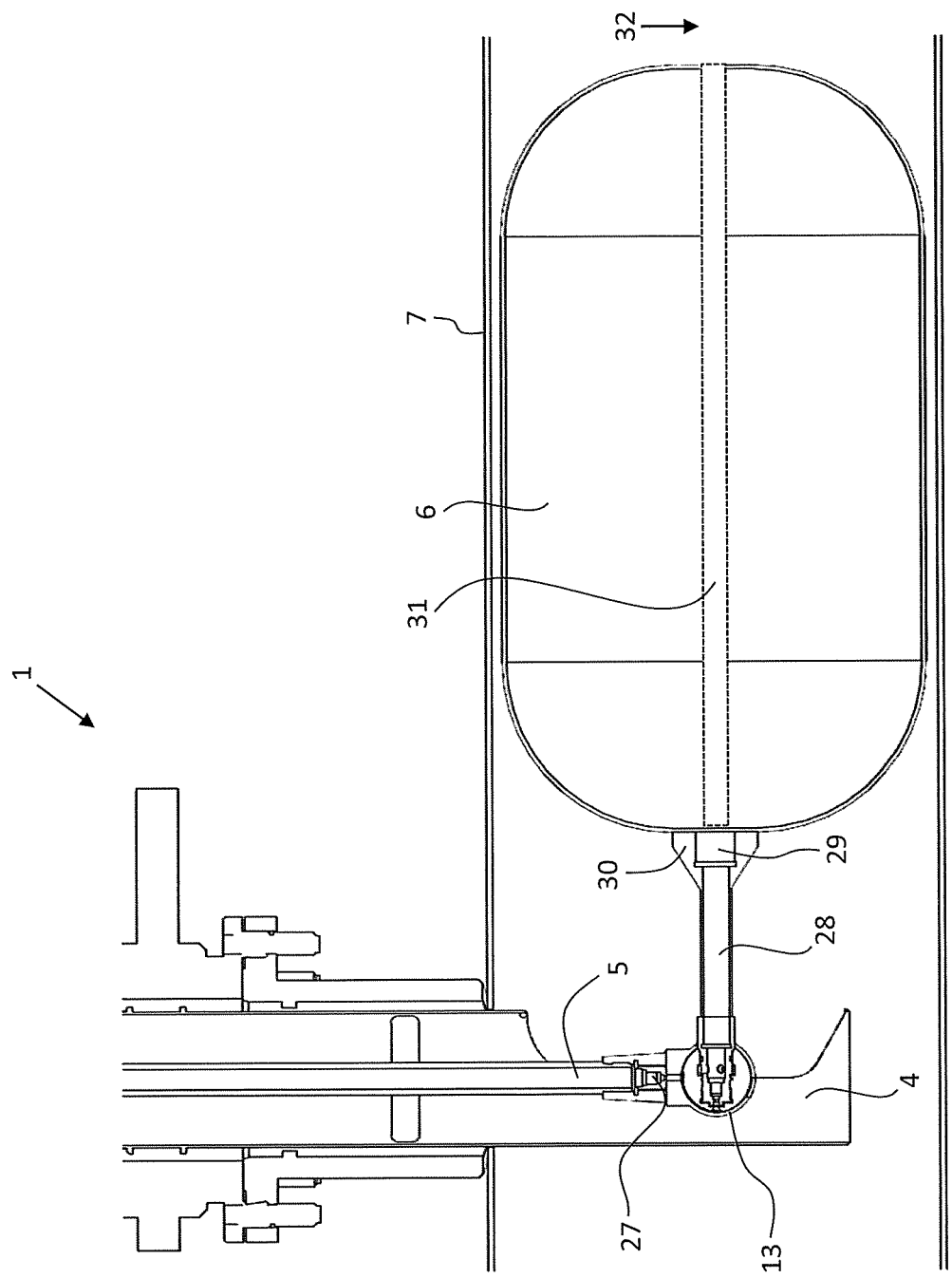
FIG. 3A shows another exemplary embodiment of the present invention in use, in which the balloon-like element is in the inflated state.
Figure 3B:
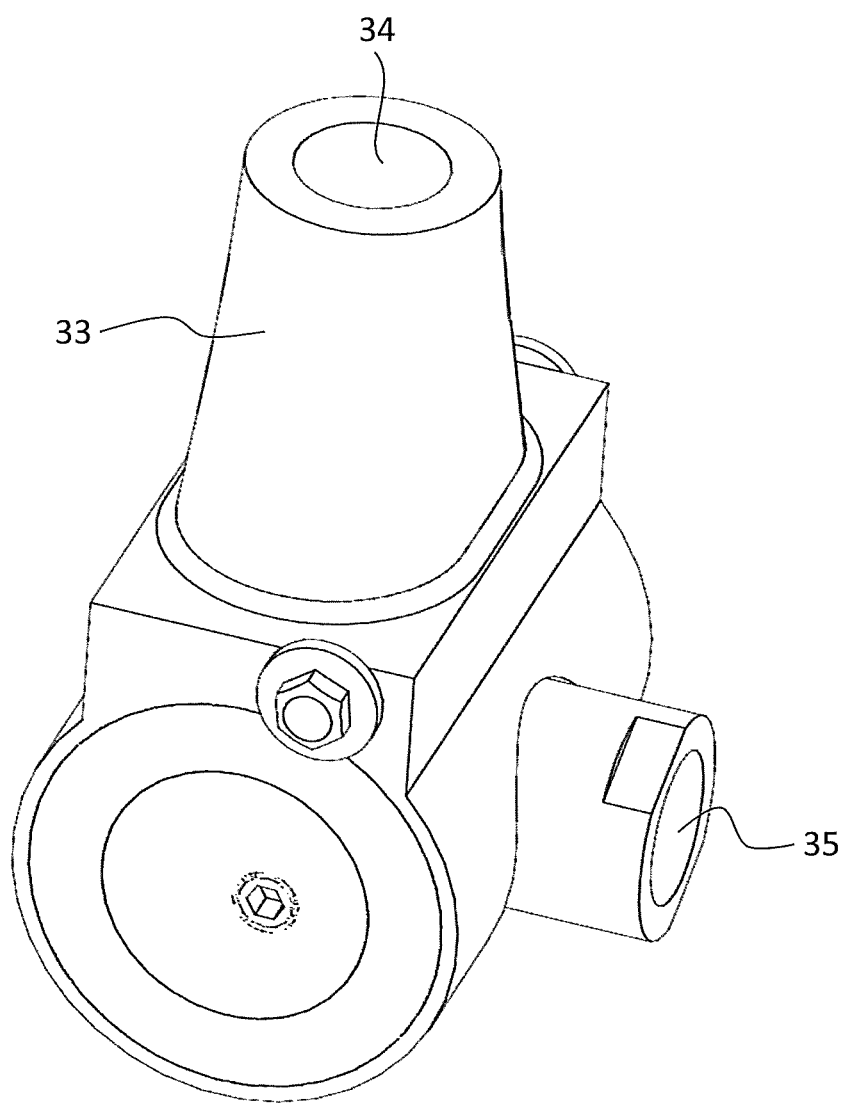

Reference is made to FIG. 3A, which shows a flow stopping tool 1 according to the present invention, in which a different embodiment of a hinged coupling 13 is used. Said hinged coupling 13 is in connection with the pressure rod 5 via a nipple 27 that is received in a first element of the hinged coupling 13. Hinged coupling 13 comprises a second element, which is in connection to balloon-like element 6. In the exemplary embodiment of FIG. 3A, the second element comprises a hollow cylinder 28, which is made of stainless steel. Hollow cylinder 28 comprises an end part 29 that securely connects the hollow cylinder 28 with the balloon-like element 6. Hollow cylinder 28 is further provided with a conical body 30 that further strengthens the connection between the hollow cylinder 28 and the balloon-like element 6. In this exemplary embodiment, the pressure rod 5, hinged coupling 13 and hollow cylinder 28, together with a channel 31 which extends through the balloon-like element 6, facilitate a passage to the end of the balloon-like element, to allow for pressure measurement at position 32 in front of the balloon-like element 6.

Figure 3C:
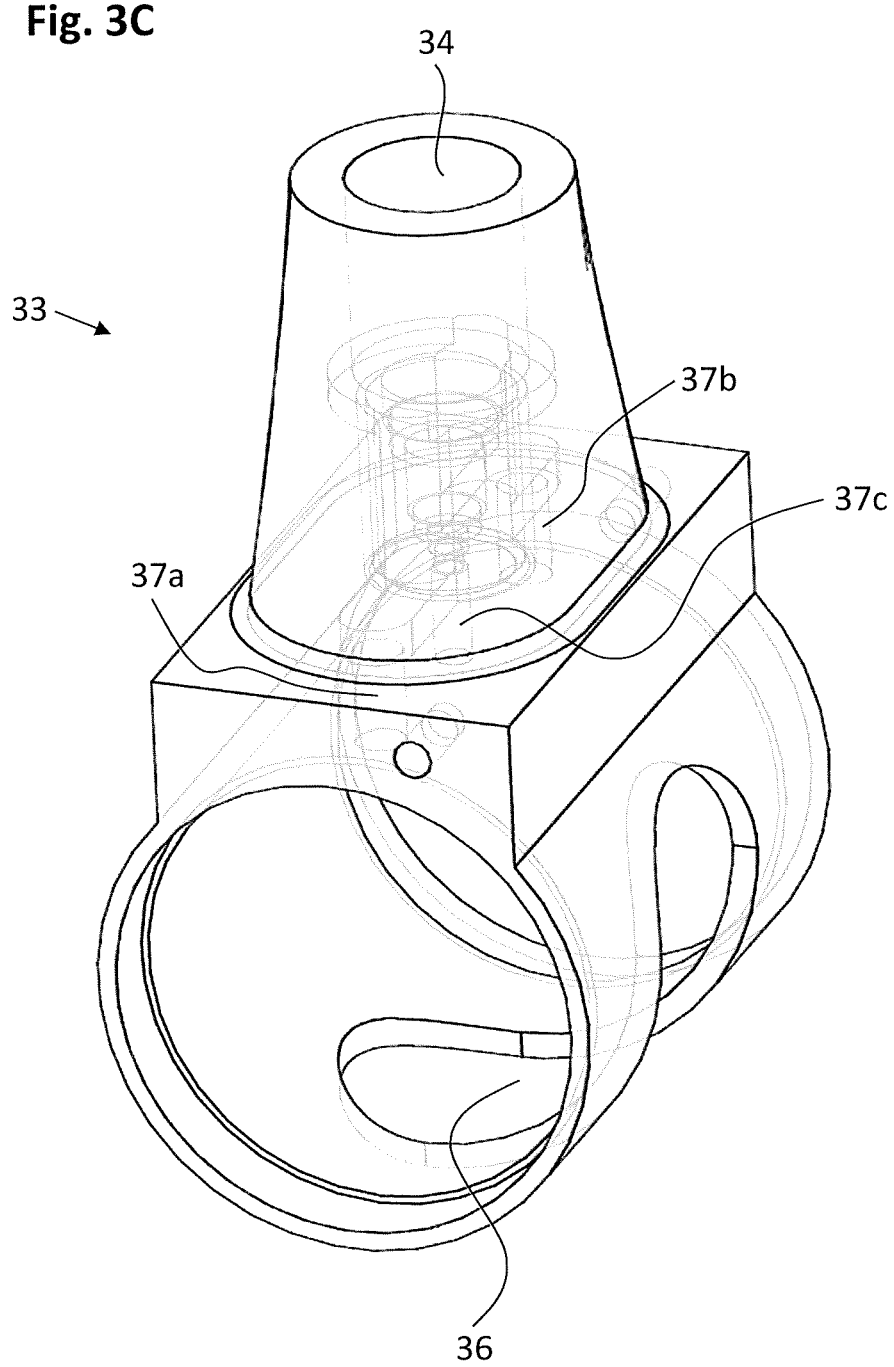

FIGS. 3B-3E show detailed perspectives of a part of the hinged coupling 13 according to the exemplary embodiment of FIG. 3A. Accordingly, FIG. 3B shows the first part of the hinged coupling 13, being a housing 33 which is in connection to the pressure rod 5. The nipple 27 of pressure rod 5 can access an entry 34. Housing 33 further comprises an exit 35 that is in connection with the second element of the buckling member, which is a hollow cylinder 28. FIG. 3C shows the bare housing 33 in more detail. Accordingly, housing 33 comprises a slot 36, and channels 37a, 37b, 37c. Channels 37a and 37b facilitate means for inflating balloon-like element 6, whereas channel 37c facilitates measurement of the pressure in front of balloon-like element 6, for instance at location 32 in pipeline 7. Channel 37c is thereby in connection to the passage as provided by the pressure rod 5, hollow cylinder 28, and channel 31.

Figure 3D:
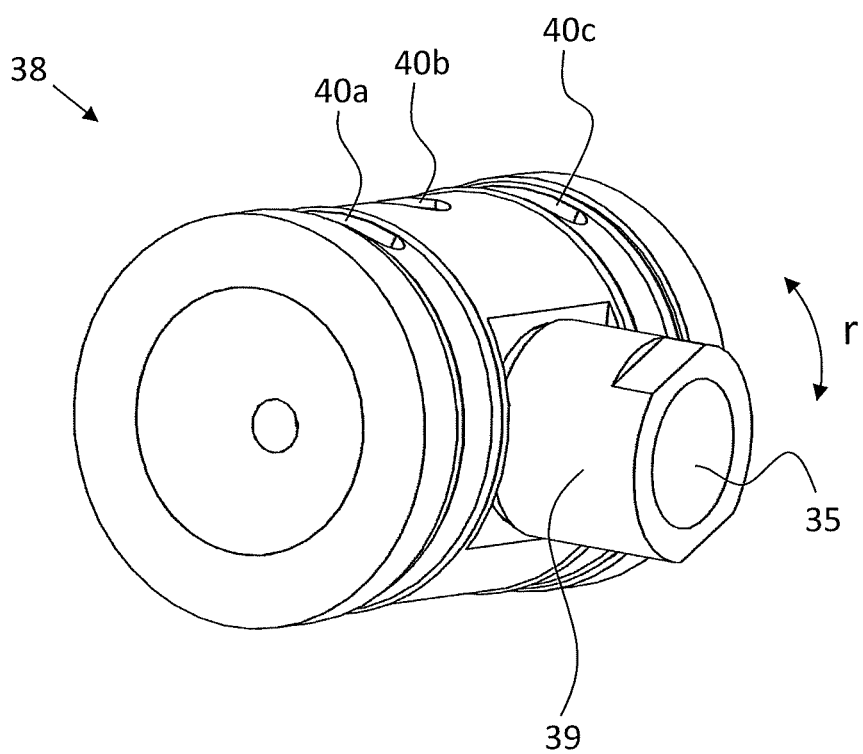

FIG. 3D shows that hinged coupling 13 further comprises a buckling member. In this example, the buckling member is a cylinder 38, which is received in housing 33. Cylinder 38 comprises a coupling member 39 that has exit 35. Cylinder 38 can hinge in housing 33. More specifically, the coupling member 39 of cylinder 38 is received in slot 36, and can rotate around its longitudinal axis in the direction (r) as indicated in FIG. 3D. Cylinder 38 further comprises grooves 40a, 40b, 40c.

Figure 3E:
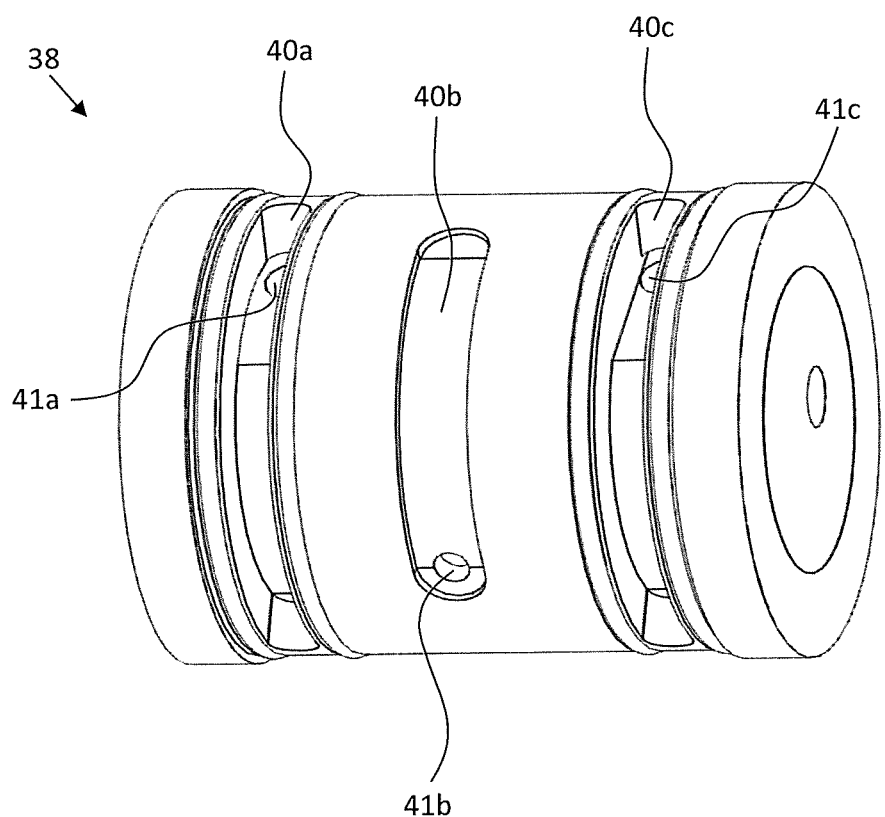

FIG. 3E shows another perspective of cylinder 38. Three grooves 40a, 40b, 40c comprise openings 41a, 41b, 41c, respectively. Openings 41a and 41c facilitate a passage for channels 37a and 37b respectively, whereas opening 41b facilitates a passage for channel 37c. Although the exemplary embodiment of FIGS. 3A-E encompass two channels for inflation and one channel for pressure measurement, any other number of channels is also possible. Furthermore, the grooves with openings may describe an angular path of at least 30° on the cylinder 38, dependent on the desired configuration of the flow stopping tool and related insertion angle of the balloon-like element 6.

It is further noted that the flow stopping tool according to the present invention does not employ sleeve retainer arms for withstanding great fluid forces in the pipeline. Instead, the flow stopping tool of the present invention employs a hinged coupling as described above. Because such sleeve retainer arms may damage pipelines, the stopping tool according to the present invention does not comprise sleeve retainer arms. Due to the strong securing connection that the hinged coupling 13 provides, hinged coupling 13 allows the balloon-like element 6 to absorb higher kinetic forces and energy, generated by the flow, than conventional flow stopping tools that use a hose for inflating the balloon-like element. Simulations and experimental tests have shown that a flow stopping tool for a pipe diameter of 300 mm, provided with said hinged coupling can resist a force generated by a pressure of 4 bar and a flow speed of 5 meter per second. The corresponding kinetic force is equal to:

$$\text{KINETIC FORCE} = C \times \text{STATIC FORCE} = 1.49 \times \pi \times P_0$$

wherein C is a dimensionless constant which is equal to 1.49 and wherein R is the radius of the pipeline which is in this case 0.15 meter and $P_0$ is the static pressure which is in this case equal to 4 bar. This results in a kinetic force of 4296 kgf. Thus, the flow stopping tool according to the present invention can withstand such a force, whereas conventional flow stopping tools in which the balloon-like element is merely secured by a hose are not compatible with said strong flows. Hence, the balloon-like element 6 with hinged coupling 13 is suitable for resisting a kinetic force of 1000 kgf or more, preferably 2000 kgf or more, even more preferably 3000 kgf or more, and most preferably 4000 kgf or more.

The present invention is of particular advantage for flow stopping tools comprising relatively large balloon-like elements, for example, balloon-like elements having a diameter when inflated of about 250 mm or higher, like for example in the range between 250 and 600 millimeter, and adapted to close pipes in the range between 250 and 600 mm.

Furthermore, the present invention does not employ a mechanism such as spring system for urging the balloon-like element at a normal angle from the second element of the hinged coupling. In contrast, the present invention is of particular advantage for insertion of a balloon-like element under any insertion angle, because the hinged coupling as described herein allows for hinging of the balloon-like element within a large angle range, e.g. such that the balloon-like element can be inserted into the pipeline at an insertion angle from at least 90°, and at most 150°, although smaller insertion angles are also possible, e.g. from 90° to 135°. Here, the insertion angle is defined with respect to the horizontal position of the balloon-like element in the pipeline. Such a hinged coupling is of particular advantage during occasions where insertion of a balloon-like element perpendicular to the pipeline wall is not preferred or even possible. For instance, FIG. 4 schematically shows a balloon-like element 6 which is in connection to the second element 28 of hinged coupling 13. Here, balloon-like element 6 is brought into the pipeline 7 under an insertion angle α=135°. In general, the hinged coupling as described herein is compatible with flow stopping tools that operate at an insertion angle α within a broad range of 90° to 150°, but also smaller ranges, such as from 90° to 135°. The grooves in the hinged coupling describe an angular path of at least 30° on the cylinder such that such an insertion angle α of the balloon-like element in the pipeline is possible. The flow stopping tool with hinged coupling can be arranged such that it allows the balloon-like element 6 to be inserted into the pipeline at a fixed insertion angle α, or at any variable insertion angle α within for example a range of 90° to 150°.

Figure 5A:
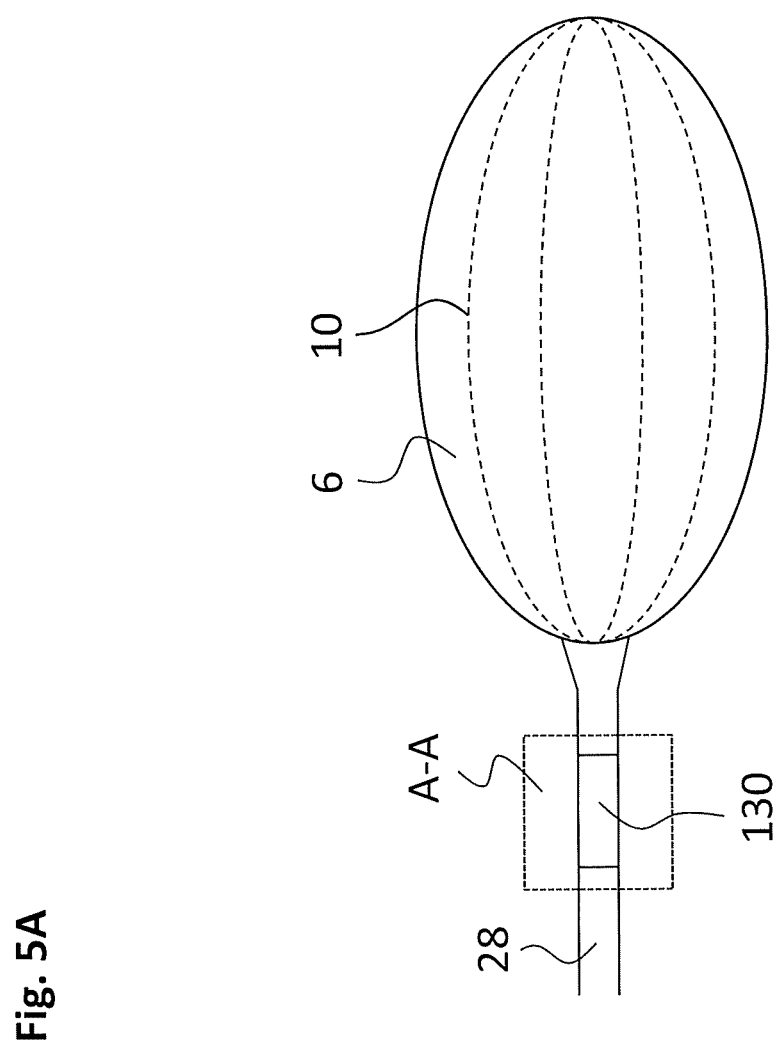

Reference is made to FIG. 5A, which shows a cross-section of the balloon-like element 6 with the hinged coupling in accordance with FIGS. 3A-E. In this figure, the group of wires 10 are visible. Furthermore, in the present embodiment, the second element 28 of the hinged coupling is additionally provided with a shock absorber 130. A plane A-A is indicated, which will be the plane of reference for the FIGS. 5B-E. The shock absorber provides for further securing means to secure the balloon-like element 6 into position in the pipeline 7 and thus further prevents that the balloon-like element 6 can rupture off from the flow stopping tool 1 during an insertion operation. The shock absorber 130 therefore allows the balloon-like element 6 to absorb even higher kinetic forces and energy, generated by the flow. Note that the shock absorber is provided outside the balloon-like element.

Reference is made to FIGS. 5B-C, which show a cross section of the shock absorber 130 in the plane A-A in more detail. Shock absorber 130 comprises a first part that is in connection to the second element 28, and a second part that is in connection to the inflatable balloon-like element 6. The second part may be received in the first part or vice versa. In this exemplary embodiment, the first part comprises a female-type connector 200 comprising a housing 210. Housing 210 may be made from, for example, stainless steel, titanium, carbon steel, aluminum or brass. Housing 210 receives the second part which is in the present exemplary embodiment a hollow rod 220. Rod 220 may be made from, for example, stainless steel, titanium, carbon steel, aluminum or brass. The second part of the shock absorber 130 further comprises a conical body 230 which is in direct connection to the balloon-like element 6.

The first and second part of the shock absorber 130 are arranged such that the first part and second part can move in the longitudinal direction with respect to one another. The longitudinal direction is indicated by direction arrow (L). In the present exemplary embodiment, the rod 220 can move in housing 210 in the longitudinal direction.

Housing 210 is provided with at least one resilient member. In the present exemplary embodiment, housing 210 is provided with a resilient member which is a helical spring 240. During introduction of balloon-like element 6 into pipeline 7, the balloon-like element is dragged into the direction of the flow (F'), which in this example corresponds to pipeline flow (F). As the balloon-like element 6 moves in the direction (F'), rod 220 moves along this direction in housing 210, and thereby compresses helical spring 240. Helical spring 240 has a sufficient spring constant and is made from a sufficient strong material to recoil the kinetic forces that are imposed on the balloon-like element during inflation, and thereby provides for a recoiling force. Thus, shock absorber 130 provides further securing means to secure the balloon-like element 6 into position in the pipeline 7 and prevents the balloon-like element 6 to be ruptured off from the flow stopping tool 1. Although in the present exemplary embodiment a helical spring is used as resilient member, the skilled person understands that other resilient members, systems or other type of springs may be used, for instance a resilient beam or a hydraulic or pneumatic system. Furthermore, one or more helical springs or other type of resilient members may also be located at the other side of housing 210 and may be attached to housing 210 and rod 220. The helical spring thereby may be stretched instead of compressed in case the balloon-like element 6 is introduced in pipeline 7. In this configuration, the at least one helical spring still provides for a recoiling force. The skilled person understands that the shock absorber 130 may comprise a combination of resilient members located at said two locations in housing 210.

Housing 210 may be further provided with one or more sealing rings or O-rings 250. In the present exemplary embodiment, the sealing rings 250 are attached to the end of rod 220. Sealing rings 250 seals the rod 220 in housing 210 and thereby prevent leakage of the medium that is used for inflating the balloon-like element.

The first part of the shock absorber 130 (e.g. female-type connector 200) may comprise a secured coupler 260 that connects the first part of the shock absorber 130 with the second element 28. Coupler 260 is arranged for receiving the first part of the shock absorber 130. Coupler 260 may for instance have a threaded profile 270. Coupler 260 may easily be mounted onto the second element 28 and thereby facilitates connection means of the shock absorber 130 to the second element 28.

In the present exemplary embodiment, a passage 280 in the shock absorber 130 and the discussed arrangement of the hinged coupling 13 facilitate a passage of medium used for inflating the balloon-like element 6. Thus, a connection is formed that connects the pressure rod 5 with the balloon-like element 6, such that the balloon-like element can be inflated with an inflation medium.

Figure 5D:
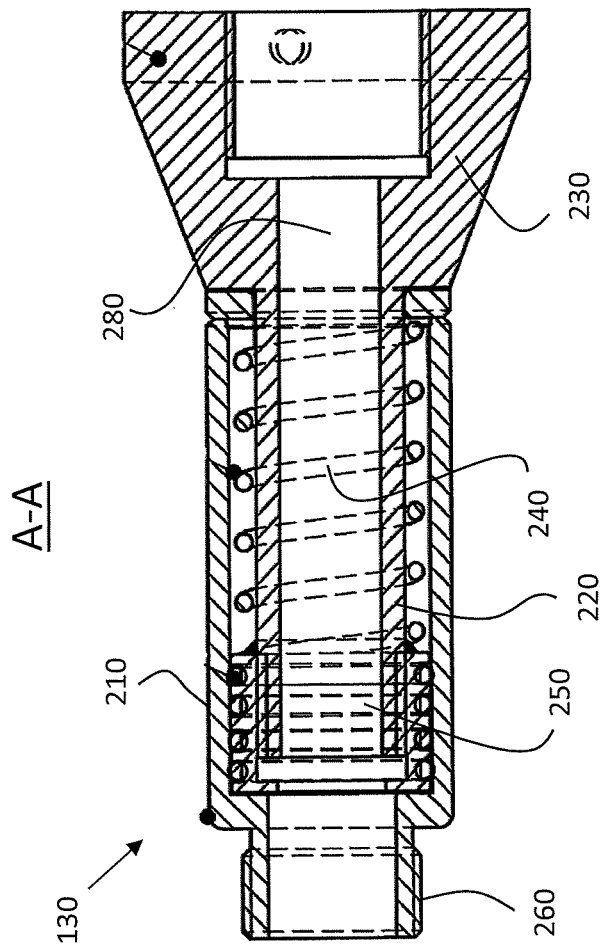
Figure 5E:
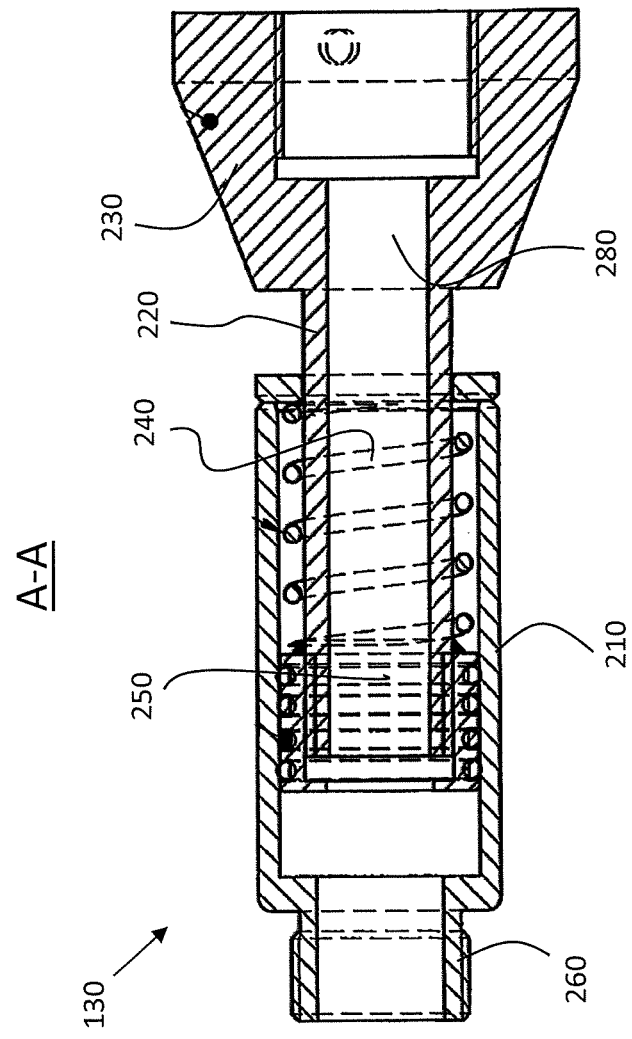

Reference is made to FIGS. 5D and 5E, showing the shock absorber 130 of FIGS. 5A-C in cross section A-A in greater detail. FIG. 5D shows the unstressed starting position (G) of shock absorber 130. In the starting position (G), the energy stored in shock absorber 130 as a result of the potential kinetic force onto the balloon is minimum, corresponding for instance to an unstretched or uncompressed helical spring 240. For instance, in the starting position (G), the balloon-like element is in rest. Shock absorber 130 is brought into a stressed state (E) once the balloon-like element starts to experience a force, from instance from the flow (F) in pipeline 7. In the exemplary embodiment of FIGS. 5A-E, the helical spring 240 is compressed in this state in the shock absorber 130. In the stressed state (E), energy will be stored in the shock absorber 130, thereby absorbing energy from flow (F) in pipeline 7. Said gained potential energy is subsequently used for recoiling balloon-like element 6 in pipeline 7

Installation of a flow stopping tool 1 may be performed as follows: a gate valve or ball valve 11 may be mounted onto the pipeline 7. Subsequently, a hole may be drilled into the pipeline 7 at the location on the pipeline 7 where a gate valve or ball valve 11 is mounted. Reference is made to FIG. 6, which shows four flow stopping tools 1a, 1b, 1c and 1d that are used to create an isolated section 42 with no flow within a pipeline 7. Isolated section 42 may be created for several different reasons, e.g. isolated section 42 requires maintenance. Prior to installation of the flow stop tool branched saddles or welded sockets 11a, 11b, 11c and 11d may be mounted onto the pipeline 7. Alternatively, gate or ball valves may be mounted onto the saddles. Subsequently, a hole may be drilled into the pipeline 7 at each location on the pipeline 7 where a gate valve or ball valve is mounted. External domes 2a, 2b, 2c, 2d are installed onto the gate valves 11a, 11b, 11c and 11d respectively. Each external dome 11a, 11b, 11c and 11d is arranged for the insertion and passage of a pressure rod 5a, 5b, 5c and 5d with a balloon-like element 6a, 6b, 6c and 6d respectively connected to pressure rods 5a, 5b, 5c and 5d. Each external dome 2a, 2b, 2c and 2d may comprise a device for measuring the pressure inside the balloon-like element, comprising for instance a pressure gauge 14a, 14b, 14c, 14d which are respectively in connection with the pressure rod 5a, 5b, 5c and 5d. Each external dome may further be provided with a by-pass 12a, 12b, 12c and 12d for bypassing a pipeline flow (F) in pipeline 7, purging nitrogen gas or flare gas from isolated section 42. At least one of the stopping towers may be a stopping tower according to the present invention. That is, at least one of the stopping towers, for example stopping tower 1a, comprises a hinged coupling 13, connecting the pressure rod with the balloon-like element. This stopping tower is then used for the first balloon to be inflated as to stop the flow in the pipeline 7. However, more or all stopping towers 1a, 1b, 1c and 1d may be provided with a hinged coupling 13. Alternatively, the other stopping towers, for instance stopping towers 1b, 1c and 1d, have a balloon-like element that is in connection to the pressure rod merely via a hose 8b, 8c, and 8d respectively.

When creating an isolated section 42 free of flow, a first balloon-like element 6a, 6b, 6c or 6d of one of the flow stopping tools 1a, 1b, 1c or 1d is inserted into pipeline 7, upstream or downstream, and is subsequently brought into the inflated state. Preferably, this stopping tower is provided with a hinged coupling 13 and optionally also with a shock absorber 130 (not shown). After the first balloon-like element has been placed into pipeline 7, for instance balloon-like element 6a, the remaining balloon-like elements can be introduced into pipeline 7. Placement of these remaining balloon-like elements 6b, 6c and 6d may be performed simultaneously or one after the other, and may be performed upstream or downstream. After all balloon-like elements 6a, 6b, 6c, 6d have been inflated and placed into pipeline 7, the isolated section 42 is free of flow whereby the medium can be removed from the isolated section 42 such that the isolated section 42 can be opened and approached. Once the operations in isolated section 42, such as maintenance work, has been finished, the balloon-like elements 6a, 6b, 6c and 6d may be deflated and retracted from the pipeline 17.

Although in above exemplary embodiment four stopping towers 1a, 1b, 1c and 1d are used to create the isolated section 27, the skilled person understands that less stopping towers may also be used to create an isolated section 42, for example with two or three stopping towers. At least one of these stopping towers may be provided with a hinged coupling 13, and optionally also with a shock absorber 130 (not shown). The skilled person in the art also understands that, dependent on the circumstances, installation of more than four stopping towers may be required to create the isolated section 42. The skilled person further understands that each stopping tower, such as stopping towers 1a, 1b, 1c and 1d, may be located at any desired distance with respect to one another, depending on the circumstances such as the available space in the trench.

The present invention has been described with regard to specific embodiments; however, it will be obvious to persons skilled in the art that a number of variants and modifications can be made without departing from the scope of the invention as described herein.

The invention claimed is:

1. A flow stopping tool for pipelines, comprising:
   an inflatable balloon-like element that is adapted for blocking a flow in the pipeline;
   means to facilitate inflation of the balloon-like element with a gas or a fluid;
   a stopping tower arranged for introducing the balloon-like element into a pipeline;
   a pressure rod that is movably arranged within the stopping tower;
   a hinged coupling for securing the balloon-like element to the pressure rod, wherein the hinged coupling comprises:
      a first element that is in connection to the pressure rod, the first element comprising a housing;
      a second element that is in connection to the balloon-like element;
      a buckling member connecting the first element to the second element, the buckling member being received in the housing of the first element, wherein the buckling member comprises a cylinder that is configured to rotate around its longitudinal axis such that the second element can hinge with respect to the first element, wherein the cylinder comprises at least one opening that facilitates measurement of the pressure in front of the balloon-like element in the pipeline, and wherein the cylinder comprises at least one further opening that facilitates inflation of the balloon-like element.

2. The flow stopping tool according to claim 1, wherein the cylinder comprises a groove comprising an opening that facilitates measurement of the pressure in the pipeline, and wherein the cylinder comprises two further grooves, each further groove comprising an opening that facilitates inflation of the balloon-like element, and wherein the grooves describe an angular path of at least 30° on the cylinder such that an insertion angle within a range of 90° to 150° of the balloon-like element into pipeline is possible.

3. The flow stopping tool according to claim 1, wherein the flow stopping tool is configured to operate at an insertion angle of the balloon-like element into the pipeline within a range of 90° to 150°, wherein the insertion angle is defined with respect to the horizontal position of the balloon-like element in the pipeline.

4. The flow stopping tool according to claim 1, in which the balloon-like element is made of an elastic or non-elastic reinforced material, and wherein the balloon-like element further comprises a wire or a group of wires with low elasticity that are placed from the one end to the other end of the balloon-like element.

5. The flow stopping tool according to claim 1, wherein the second element is connected to a shock absorber, wherein the shock absorber is connected to the balloon-like element.

6. The flow stopping tool of claim 5, wherein the shock absorber comprises a first part that is connected to the second element, and a second part that is connected to the balloon-like element, wherein the second part is received in the first part or vice versa, wherein the first and second part are arranged to move in the longitudinal direction with respect to one another.

7. The flow stopping tool of claim 6 wherein the first part and/or second part are provided with one or more resilient members such as helical springs.

8. The flow stopping tool according to claim 6, wherein the first part of the shock absorber comprises a shock absorber housing, and wherein the second part of the shock absorber comprises a rod which is received in said housing.

9. The flow stopping tool according to claim 1, in which the balloon-like element is suitable for resisting a kinetic force of 1000 kgf or more.

10. The flow stopping tool according to claim 1, in which the balloon-like element is adapted to close a pipe having a diameter in the range between 250 and 600 millimeter.

11. The flow stopping tool according to claim 1, in which the pressure rod is further arranged with a device for measuring the inflation pressure of the balloon-like element.

12. A pressure rod with a balloon-like element for use with a flow stopping tool, wherein the pressure rod comprises a hinged coupling for securing the balloon-like element to the pressure rod, wherein the hinged coupling comprises:
    a first element that is in connection to the pressure rod, the first element comprising a housing;
    a second element that is in connection to the balloon-like element;
    a buckling member connecting the first element to the second element, the buckling member being received in the housing of the first element, wherein the buckling member comprises a cylinder that is configured to rotate around its longitudinal axis such that the second element can hinge with respect to the first element, wherein the cylinder comprises at least one opening that facilitates measurement of the pressure in front of the balloon-like element in the pipeline, and wherein the cylinder comprises at least one further opening that facilitates inflation of the balloon-like element.

13. A method for stopping a flow in a pipeline, comprising the steps of:
    installing a flow stopping tool according to claim 1 onto a pipeline;
    introducing the balloon-like element into the pipeline by moving the pressure rod in the direction of the pipeline;
    inflating the balloon-like element for stopping a flow in the pipeline.

14. A procedure for creating an isolated section in a pipeline free of flow, comprising the steps of:
    installing a first flow stopping tool onto a pipeline;
    installing a second flow stopping tool onto the pipeline;
    installing a third flow stopping tool onto the pipeline;
    installing a fourth flow stopping tool onto the pipeline;
    wherein all four stopping tools each comprise:
    an inflatable balloon-like element for blocking a flow in the pipeline;
    means to facilitate inflation of the balloon-like element with a gas or a fluid;
    a stopping tower arranged for introducing the balloon-like element into the pipeline;
    a pressure rod that is movably arranged within the stopping tower;
    and wherein at least one of the flow stopping tools is arranged according to claim 1;
    introducing the at least one balloon-like element of the stopping tool with the hinged coupling as the first to be inflated balloon like element into the pipeline by moving the pressure rod of said at least one balloon-like element in the direction of the pipeline;
    inflating said at least one balloon-like element such as to stop the flow in the pipeline.

15. The procedure according to claim 14, wherein prior to installation of the four flow stopping tools the following steps are performed:
    mounting four ball valves or gate valves on a saddle or welded socket that are fixed onto the pipeline;
    drilling a hole into the pipeline at each location where a ball valve or gate valve is mounted on the pipeline.

16. The flow stopping tool according to claim 1, in which the balloon-like element is suitable for resisting a kinetic force of 2000 kfg or more.

17. The flow stopping tool according to claim 1, in which the balloon-like element is suitable for resisting a kinetic force of 3000 kfg or more.

18. The flow stopping tool according to claim 1, in which the balloon-like element is suitable for resisting a kinetic force of 4000 kfg or more.

* * * * *